United States Patent
Xi et al.

(10) Patent No.: US 10,931,791 B2
(45) Date of Patent: Feb. 23, 2021

(54) METHOD AND APPARATUS FOR PROCESSING REQUEST

(71) Applicant: Beijing Baidu Netcom Science and Technology Co., Ltd., Beijing (CN)

(72) Inventors: Tao Xi, Beijing (CN); Liguo Duan, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 0 days.

(21) Appl. No.: 16/564,020

(22) Filed: Sep. 9, 2019

(65) Prior Publication Data

US 2020/0204651 A1 Jun. 25, 2020

(30) Foreign Application Priority Data

Dec. 19, 2018 (CN) .......................... 201811558788.2

(51) Int. Cl.
| H04L 29/06 | (2006.01) |
| H04L 9/06 | (2006.01) |
| H04L 12/24 | (2006.01) |
| H04L 29/08 | (2006.01) |

(52) U.S. Cl.
CPC ............ *H04L 67/42* (2013.01); *H04L 9/0643* (2013.01); *H04L 41/042* (2013.01); *H04L 63/10* (2013.01); *H04L 67/34* (2013.01)

(58) Field of Classification Search
CPC ............................... H04L 67/42; H04L 67/34
See application file for complete search history.

(56) References Cited

U.S. PATENT DOCUMENTS

2003/0097564 A1* 5/2003 Tewari ............. H04L 29/12113
713/171
2011/0153724 A1 6/2011 Raja et al.

FOREIGN PATENT DOCUMENTS

| CN | 102137006 A | 7/2011 |
| CN | 105337891 A | 2/2016 |
| CN | 108880923 A | 11/2018 |

* cited by examiner

*Primary Examiner* — Adnan M Mirza
(74) *Attorney, Agent, or Firm* — The Webb Law Firm

(57) ABSTRACT

Embodiments of the present disclosure disclose a method and apparatus for processing a request. A specific embodiment of the method includes: receiving a request; determining a type of the request or an object name indicated by the request; acquiring, after determining that a current time is after a validity deadline of locally stored first request control information, the number of control servers in a preset control server set; determining, from the control server set, a target control server based on the acquired number and any one of: the type of the request, the object name indicated by the request; and forwarding the request to the target control server.

17 Claims, 6 Drawing Sheets

METHOD AND APPARATUS FOR PROCESSING REQUEST

CROSS-REFERENCE TO RELATED APPLICATION

This application claims priority to Chinese Patent Application No. 2018/11558788.2 filed Dec. 19, 2018, the disclosure of which is hereby incorporated by reference in its entirety.

TECHNICAL FIELD

Embodiments of the present disclosure relate to the field of computer technology, specifically to a method and apparatus for processing a request.

BACKGROUND

The existing traffic control solution applied to a distributed system generally adopts the form of single machine pre-allocation. That is, the traffic limit value that a user may use is configured in a single machine, and the traffic is controlled by the traffic limit value. The above solution is simple to implement, and runs well under the condition of balanced browsing and stable system disaster tolerance.

SUMMARY

Embodiments of the present disclosure propose a method and apparatus for processing a request.

In a first aspect, some embodiments of the present disclosure provide a method for processing a request, including: receiving a request; determining a type of the request or an object name indicated by the request; in response to determining that a current time is after a validity deadline of locally stored first request control information, acquiring the number of control servers in a preset control server set; determining, from the control server set, a target control server based on the acquired number and any one of: the type of the request, the object name indicated by the request; and forwarding the request to the target control server.

In some embodiments, the method further includes: processing the request based on the first request control information, in response to determining that the current time is before the validity deadline of the first request control information.

In some embodiments, the determining, from the control server set, a target control server according to the acquired number and any one of: the type of the request, the object name indicated by the request, includes: determining a hash value by performing a hash calculation on any of: the type of the request, the object name indicated by the request; and determining the target control server from the control server set based on the hash value and the number.

In some embodiments, the method further includes: receiving second request control information and a validity deadline of the second request control information, where the second request control information is received from the target control server or other access server; and processing the received request based on the second request control information, in response to the current time being before the validity deadline of the second request control information.

In some embodiments, the method further includes: storing the second request control information and the validity deadline of the second request control information locally to replace the original first request control information and replace the validity deadline of the original first request control information.

In some embodiments, the second request control information includes the number of forwarding times; and the method further includes: in response to determining that the current time is before the validity deadline of the second request control information and the number of forwarding times is less than a preset number of forwarding threshold; and increasing the number of forwarding times by a preset value, sending the second request control information and the validity deadline of the second request control information to at least one access server connected thereto.

In a second aspect, some embodiments of the present disclosure provide a method for processing a request, including: receiving a request sent by an access server; determining a type of the request or an object name indicated by the request; in response to determining that a current time is after a validity deadline of locally stored third request control information, counting a traffic required for requests of an identical type or of an identical object name; generating fourth request control information based on a preset traffic threshold and the determined traffic; and sending the fourth request control information to the access server.

In some embodiments, the method further includes: in response to determining that the current time is before the validity deadline of the locally stored third request control information, sending the third request control information and the validity deadline of the third request control information to the access server, for the access server to store the third request control information and the validity deadline locally.

In some embodiments, the method further includes: storing the fourth request control information locally as new third request control information to replace the original third request control information; and determining, based on a generation time of the fourth request control information and a preset first validity duration, a first validity deadline of the fourth request control information.

In some embodiments, the sending the fourth request control information to the access server, includes: setting the number of forwarding times of the fourth request control information to a first preset value; determining, based on the generation time of the fourth request control information and a preset second validity duration, a second validity deadline of the fourth request control information; and sending the fourth request control information, the number of forwarding times, and the second validity deadline to the access server, so that the access server increases the number of forwarding times by a second preset value when forwarding the fourth request control information.

In some embodiments, the second validity duration is greater than the first validity duration.

In a third aspect, some embodiments of the present disclosure provide an apparatus for processing a request, including: a first request receiving unit, configured to receive a request; a first information determining unit, configured to determine a type of the request or an object name indicated by the request; a number determining unit, configured to acquire, in response to determining that a current time is after a validity deadline of locally stored first request control information, the number of control servers in a preset control server set; a target determining unit, configured to determine, from the control server set, a target control server based on the acquired number and any one of the following: the type of the request, the object name indicated by the request; and a request forwarding unit, configured to forward the request to the target control server.

In some embodiments, the apparatus further includes a first request processing unit, configured to process the request based on the first request control information, in response to determining that the current time is before the validity deadline of the first request control information.

In some embodiments, the target determining unit is further configured to: determine a hash value by performing a hash calculation on any of the following: the type of the request, the object name indicated by the request; and determine the target control server from the control server set based on the hash value and the number.

In some embodiments, the apparatus further includes: a first information receiving unit, configured to receive second request control information and a validity deadline of the second request control information, where the second request control information is received from the target control server or other access server; and a second request processing unit, configured to process the received request based on the second request control information, in response to the current time being before the validity deadline of the second request control information.

In some embodiments, the apparatus further includes: a first information storing unit, configured to store the second request control information and the validity deadline of the second request control information locally to replace the original first request control information and replace the validity deadline of the original first request control information.

In some embodiments, the second request control information includes the number of forwarding times; and the apparatus further includes: a first information forwarding unit, configured to send the second request control information and the validity deadline of the second request control information to at least one access server connected, in response to determining that the current time is before the validity deadline of the second request control information and the number of forwarding times is less than a preset number of forwarding threshold; and increase the number of forwarding times by a preset value.

In a fourth aspect, some embodiments of the present disclosure provide an apparatus for processing a request, including: a second request receiving unit, configured to receive a request sent by an access server; a second information determining unit, configured to determine a type of the request or an object name indicated by the request; a traffic counting unit, configured to count a traffic required for requests of an identical type or of an identical object name, in response to determining that a current time is after a validity deadline of locally stored third request control information; an information generation unit, configured to generate fourth request control information based on a preset traffic threshold and the determined traffic; and a second information forwarding unit, configured to send the fourth request control information to the access server.

In some embodiments, the apparatus further includes: a third information forwarding unit, configured to send the third request control information and the validity deadline of the third request control information to the access server, in response to determining that the current time is before the validity deadline of the locally stored third request control information, for the access server to store the third request control information and the validity deadline locally.

In some embodiments, the apparatus further includes: a second information storing unit, configured to store the fourth request control information locally as new third request control information to replace the original third request control information; and a time determining unit, configured to determine, based on a generation time of the fourth request control information and a preset first validity duration, a first validity deadline of the fourth request control information.

In some embodiments, the second information forwarding unit includes: a number determining module, configured to set the number of forwarding times of the fourth request control information to a first preset value; a time determining module, configured to determine, based on the generation time of the fourth request control information and a preset second validity duration, a second validity deadline of the fourth request control information; and an information forwarding module, configured to send the fourth request control information, the number of forwarding times, and the second validity deadline to the access server, so that the access server increases the number of forwarding times by a second preset value when forwarding the fourth request control information.

In some embodiments, the second validity duration is greater than the first validity duration.

In a fifth aspect, the embodiments of the present disclosure provide an access server, including: one or more processors; and a storage apparatus, storing one or more programs thereon, the one or more programs, when executed by the one or more processors, cause the one or more processors to implement the method according to any one of the embodiments in the first aspect.

In a sixth aspect, the embodiments of the present disclosure provide a control server, including: one or more processors; and a storage apparatus, storing one or more programs thereon, the one or more programs, when executed by the one or more processors, cause the one or more processors to implement the method according to any one of the embodiments in the second aspect.

In a seventh aspect, the embodiments of the present disclosure provide a computer readable medium, storing a computer program thereon, the program, when executed by a processor, implements the method according to any one of the embodiments in the first aspect.

In an eighth aspect, the embodiments of the present disclosure provide a computer readable medium, storing a computer program thereon, the program, when executed by a processor, implements the method according to any one of the embodiments in the second aspect.

The method and apparatus for processing a request provided by the above embodiments of the present disclosure, after receiving the request, may determine the type of the request or the object name indicated by the request; in response to determining that the current time is after the validity deadline of the locally stored first request control information, acquire the number of the control servers in the preset control server set; then determine, from the control server set, the target control server based on the acquired number and any one of the following: the type of the request, the object name indicated by the request; and finally, forward the request to the target control server. The method of the present embodiment may be applied to a distributed system and send the request to the corresponding control server, which is convenient for the control server to control the request based on global data, thereby improving the accuracy of controlling the request in the distributed environment.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
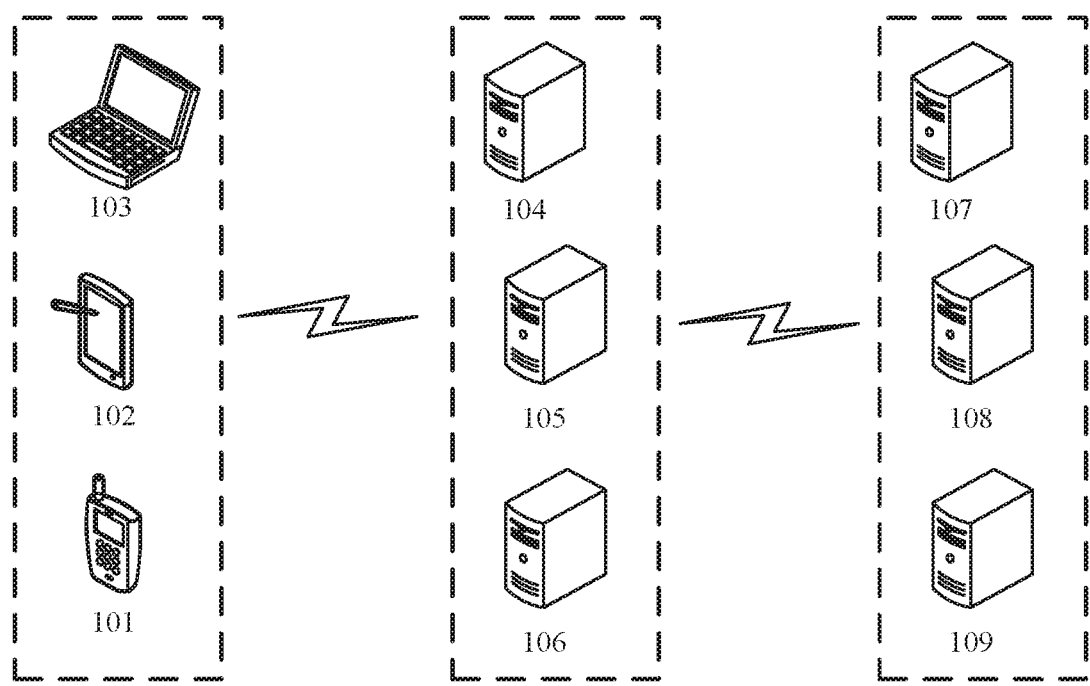
FIG. 1 is a diagram of an exemplary system architecture in which an embodiment of the present disclosure may be implemented.

FIG. 1 illustrates an exemplary system architecture 100 of an embodiment of a method for processing a request or an apparatus for processing a request in which the present disclosure may be implemented.

As shown in FIG. 1, the system architecture 100 may include terminal devices 101, 102, 103, access servers 104, 105, 106 and control servers 107, 108, 109. The network 104 is used to provide a communication link medium between the terminal devices 101, 102, 103 and the server 105. The network 104 may include various types of connections, such as wired, wireless communication links, or optic fibers.

A user may interact with the server 105 using terminal devices 101, 102, 103 to receive or send messages and the like. Various communication client applications, such as web browser applications, shopping applications, search applications, instant communication tools, mailbox clients, social platform software, may be installed on the terminal devices 101, 102, and 103.

The terminal devices 101, 102, 103 may be hardware or software. When the terminal devices 101, 102, and 103 are hardware, they may be various electronic devices having display screens and supporting web browsing, including but not limited to smart phones, tablets, e-book readers, MP3 (Moving Picture Experts Group Audio Layer III) players, MP4 (Moving Picture Experts Group Audio Layer IV) players, laptop portable computers and desktop computers, and the like. When the terminal devices 101, 102, 103 are software, they may be installed in the above-listed electronic devices. They may be implemented as a plurality of software or software modules (for example, for providing distributed services) or as a single software or software module, which is not specifically limited herein.

The access servers 104, 105, 106 may be servers that provide various services, such as servers that provide support for network connections of the terminal devices 101, 102, 103. The server may perform processing such as analyzing data such as a received request, and feedback a processing result (for example, the processing result of the request) to the terminal devices 101, 102, and 103.

The control servers 107, 108, 109 may be servers that provide various services, such as servers that control the traffic of requests sent by the access servers 104, 105, 106. The server may perform processing such as analyzing data such as the received request, and feed back a processing result (for example, whether to perform traffic control) to the access servers 104, 105, and 106.

It should be noted that the access servers 104, 105, and 106 and the control servers 107, 108, and 109 may be hardware or software. When the access servers 104, 105, 106 and the control servers 107, 108, 109 are hardware, they may be implemented as a distributed server cluster/distributed device cluster composed of a plurality of servers, or may be implemented as a single server/single device. When the access servers 104, 105, 106 and the control servers 107, 108, 109 are software, they may be implemented as a plurality of software or software modules (for example, for providing distributed services), or may be implemented as a single software or software module, which is not specifically limited herein.

It should be noted that the method for processing a request provided by the embodiments of the present disclosure may be performed by the access servers 104, 105, 106, or may be performed by the control servers 107, 108, 109. Accordingly, the apparatus for processing a request may be provided in the access servers 104, 105, 106 or may be provided in the control servers 107, 108, 109.

It should be understood that the number of terminal devices, access servers, and control servers in FIG. 1 is merely illustrative. Depending on the implementation needs, there may be any number of terminal devices, access servers, and control servers.

Figure 2:
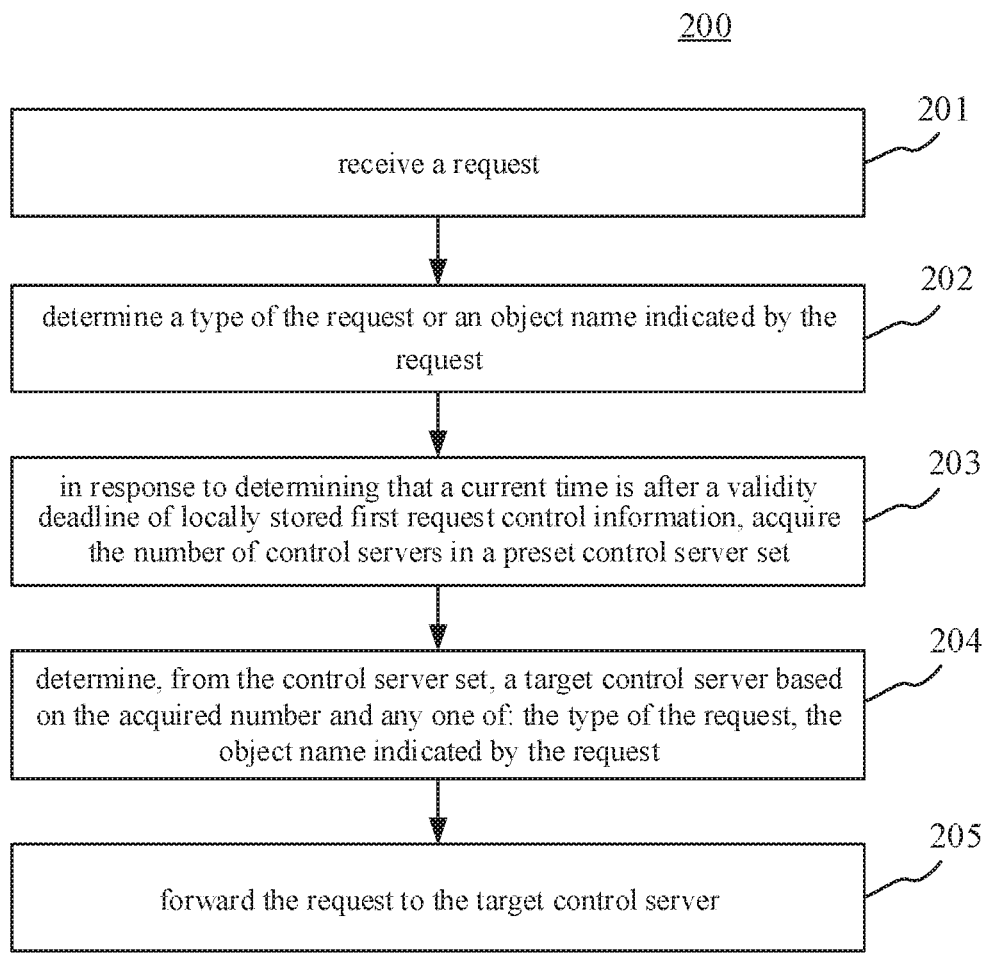
FIG. 2 is a flowchart of an embodiment of a method for processing a request according to the present disclosure.

With further reference to FIG. 2, a flow 200 of an embodiment of a method for processing a request according to the present disclosure is illustrated. The method for processing a request in the present embodiment is applied to an access server, and includes the following steps:

Step 201, receiving a request.

In the present embodiment, an executive body of the method for processing a request (for example, the access servers 104, 105, 106 shown in FIG. 1) may receive the request from a terminal device (for example, the terminal devices 101, 102, 103 shown in FIG. 1) through a wired connection or a wireless connection. The request may be an HTTP (Hyper Text Transfer Protocol) request.

It should be noted that the wireless connection may include but is not limited to 3G/4G connection, WiFi connection, Bluetooth connection, WiMAX connection, Zigbee connection, UWB (ultra wideband) connection, and other wireless connection methods that are now known or to be developed in the future.

Step 202, determining a type of the request or an object name indicated by the request.

After receiving the request, the executive body may determine the type of the request or the object name indicated by the request. The type of the request may include PUT, GET, POST, and so on. The PUT request is used to put information on the requested URL (Uniform Resource Locator). The GET request is used to request a resource from a specified URL. The POST request is used to submit data to a specified URL. The terminal device may request a resource object by sending a request to the executive body, and the resource object may be a memory, a disk, a network, a CPU (Central Processing Unit) resource, or the like. The object name may be a memory, a disk, a network, a CPU resource, or the like.

Step 203, in response to determining that a current time is after a validity deadline of locally stored first request control information, acquiring the number of control servers in a preset control server set.

The executive body may locally store first request control information, and the first request control information is used to guide the executive body to process the received request. For example, the executive body may determine whether to forward the request according to the first request control information. The first request control information may correspond to a validity deadline. If the current time is before the validity deadline, the executive body may process the request according to the first request control information. If the current time is after the validity deadline, indicating that the first request control information is invalid, and the executive body cannot process the request according to the first request control information. By setting a validity deadline for the first request control information, the solution of the present embodiment may process and control a request more flexibly than the existing solution of configuring the traffic control policy in a single machine, and improve the control flexibility of the distributed system to the traffic.

After determining the type of the request or the object name indicated by the request, the executive body may determine whether the current time is before the validity deadline of the first request control information. If the current time is after the validity deadline of the first request control information, the number of the control servers in the preset control server set may be acquired. Here, the control server may be a server for traffic control. Each control server is responsible for the traffic control of requests of an identical type or requests of an identical object. A plurality of control servers may be included in the preset control server set such that the control servers in the control server set may process different types of requests or process requests for different objects.

The executive body may determine the number of the control servers in the server set by acquiring the topology structure of the control server set.

In some alternative implementations of the present embodiment, the method may further include the following step not shown in FIG. 2: in response to determining that the current time is before the validity deadline of the first request control information, processing the request based on the first request control information.

In this implementation, if the current time is before the validity deadline of the first request control information, the first request control information is still valid. Then, the executive body may process the request according to the first request control information.

Step 204, determining, from the control server set, a target control server based on the acquired number and any one of: the type of the request, the object name indicated by the request.

After determining the number, the executive body may determine the target control server from the control server set in a variety of ways. For example, the executive body may determine the target control server based on the number and the type of request. Alternatively, the executive body may determine the target control server based on the number and the object name indicated by the request.

In some alternative implementations of the present embodiment, the executive body may also determine the target control server through the following steps not shown in FIG. 2: determining a hash value by performing a hash calculation on any of: the type of the request, the object name indicated by the request; and determining the target control server from the control server set based on the hash value and the number. In this way, the target control server may be adjusted according to the number of control servers in the distributed system, so that the traffic control result can be flexibly updated.

The type of the request and the object name indicated by the request may be represented by a string. In this implementation, hash calculation may be performed on the string to obtain a hash value. Then, modulo operation is performed using the hash value and the number of the control servers in the control server set. The modulo result is rounded up or rounded down. The target control server is determined based on the obtained integer. It may be understood that for the requests of identical type or requests of identical object name, a same string is used. After the hash calculation, the resulting hash values are also same. Then, the determined target control servers are same, thereby ensuring that a target control server handles requests of an identical type or of an identical object name.

Step 205, forwarding the request to the target control server.

After determining the target control server, the executive body may forward the request to the target control server to make the target control server to control the request.

The method for processing a request provided by the above embodiment of the present disclosure, after receiving the request, the type of the request or the object name indicated by the request may be determined; after determining that the current time is after the validity deadline of the locally stored first request control information, the number of the control servers in the preset control server set is acquired; then the target control server is determined from the control server set based on the acquired number and any one of the following: the type of the request, the object name indicated by the request; and finally, the request is forwarded to the target control server. The method of the present embodiment may be applied to a distributed system and send the request to the corresponding control server, which is convenient for the control server to control the request based on global data; at the same time, by setting a validity deadline for the first request control information, the request may be flexibly controlled, thereby improving the accuracy of controlling the request in the distributed environment.

In some alternative implementations of the present embodiment, the method for processing a request may further include the following steps not shown in FIG. 2: receiving second request control information and a validity deadline of the second request control information; and processing the received request based on the second request control information, in response to the current time being before the validity deadline of the second request control information.

In this implementation, the executive body may receive the second request control information and the validity deadline of the second request control information from the target control server or other access server. The second request control information is valid when it is determined that the current time is before the validity deadline of the second request control information. Then, the executive body may process the received request according to the second request control information.

In some alternative implementations of the present embodiment, the method for processing a request may further include the following steps not shown in FIG. 2: storing the second request control information and the validity deadline of the second request control information locally, to replace the original first request control information and replace the validity deadline of the original first request control information.

The executive body may also store the received second request control information and the validity deadline of the second request control information locally, to replace the original first request control information and replace the validity deadline of the original first request control information. In this way, the executive body may process the request according to the updated first request control information and the updated validity deadline when receives the request next time.

In some alternative implementations of the present embodiment, the second request control information may further include the number of forwarding times. The number of forwarding times may be presented in the second request control information in the form of a sign or an identifier. The method for processing a request may further include the following steps not shown in FIG. 2: in response to determining that the current time is before the validity deadline of the second request control information and the number of forwarding times is less than a preset number of forwarding threshold, sending the second request control information and the validity deadline of the second request control information to at least one access server connected; and increasing the number of forwarding times by a preset value.

After determining that the current time is before the validity deadline of the second request control information, the executive body may continue to determine whether the number of forwarding times is less than the preset number of forwarding threshold. If it is determined that the number of forwarding times is less than the preset number of forwarding threshold, the executive body may send the second request control information to the at least one access server connected thereto. At the same time, the validity deadline of the second request control information may also be forwarded. At the same time, the executive body may also increase the number of forwarding times by the preset value. For example, the number of forwarding times is increased by 1. It may be understood that if the second request control information is received by the executive body from other access servers, then when the executive body forwards the second request control information, the executive body may not send the second request control information to the access server which forwards the second request control information to the the executive body.

There may be a plurality of access servers, and the terminal device may send requests of an identical type or request of an identical object name to different access servers. If an access server A receives a request of type a, then it forwards the request to a control server. The control server generates second request control information for the request of type a. The second request control information is then sent to the access server A. However, an access server B may also receive a request of type a. If the second request control information is not stored locally in the access server B, the access server B can only send the request of type a to the control server, and the control server needs to resend the second request control information to the access server B. In the solution of the present implementation, after receiving the second request control information, the access server A may forward the second request control information to the access server B. The computational pressure of the control server may be reduced. At the same time, in order to avoid a network storm caused by forwarding the second request control information, in this implementation, a forwarding times threshold is set for the second request control information, thereby avoiding increasing a network load of the distributed system.

Figure 3:
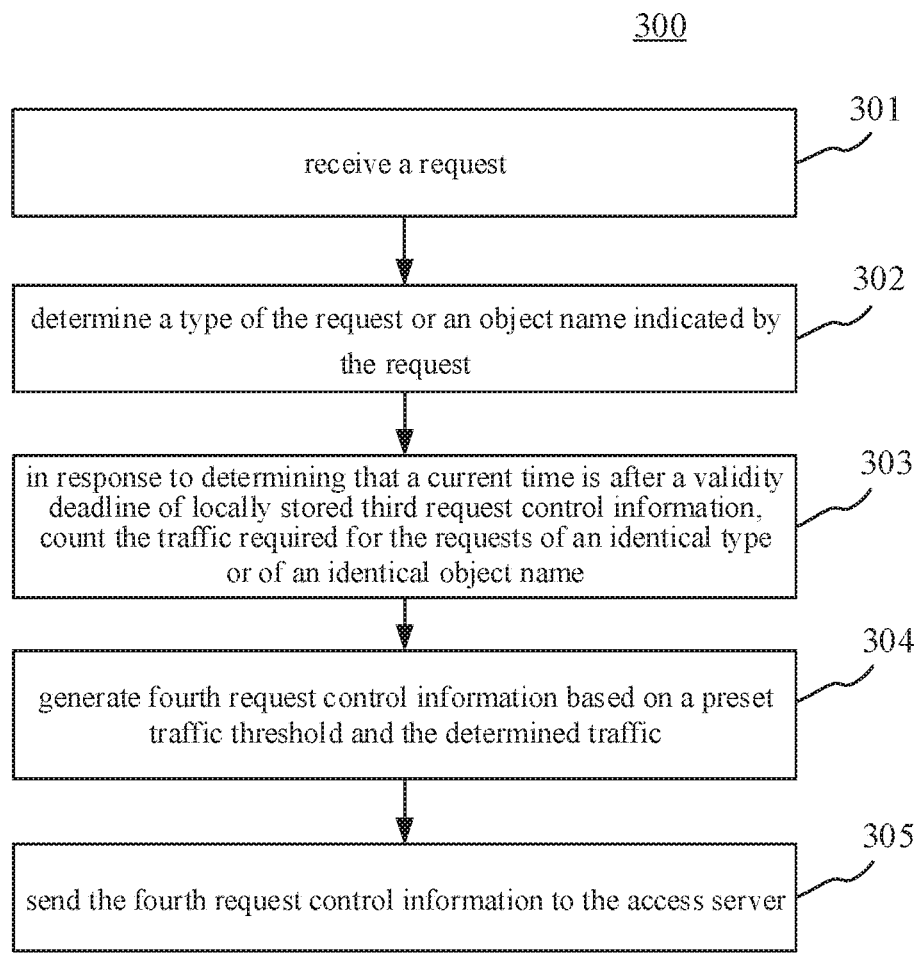
FIG. 3 is a flowchart of another embodiment of a method for processing a request according to the present disclosure.

With further reference to FIG. 3, a flow 300 of another embodiment of a method for processing a request according to the present disclosure is illustrated. As shown in FIG. 3, the method of the present embodiment is applied to a control server, and includes the following steps:

Step 301, receiving a request sent by an access server.

In the present embodiment, an executive body of the method for processing a request (for example, the control servers 107, 108, 109 shown in FIG. 1) may receive the request from the access server (for example, the access servers 104, 105, 106 shown in FIG. 1). The request may be an HTTP request.

Step 302, determining a type of the request or an object name indicated by the request.

After receiving the request, the executive body may determine the type of the request or the object name indicated by the request. The type of the request may include PUT, GET, POST, and so on. The PUT request is used to put information on the requested URL (Uniform Resource Locator). The GET request is used to request a resource from a specified URL. The POST request is used to submit data to a specified URL. The terminal device may request a resource object by sending a request to the executive body, and the resource object may be a memory, a disk, a network, a CPU (Central Processing Unit) resource, or the like. The object name may be a memory, a disk, a network, a CPU resource, or the like.

Step 303, in response to determining that a current time is after a validity deadline of locally stored third request control information, counting a traffic required for requests of an identical type or an identical object name.

The executive body may locally store third request control information, and the third request control information is used to guide the executive body to process the received request. For example, the executive body may determine whether to perform traffic control on the request according to the third request control information. The third request control information may correspond to a validity deadline. Before the validity deadline, the executive body may process the request according to the third request control information. After the validity deadline, it indicates that the third request control information is invalid, and the executive body cannot process the request according to the third request control information. By setting a validity deadline for the third request control information, the solution of the present embodiment may process and control the request more flexibly than the existing solution of configuring the traffic control policy in a single machine, and may improve the control flexibility of the distributed system to the traffic.

After determining the type of the request or the object name indicated by the request, the executive body may determine whether the current time is before the validity deadline of the third request control information. If the current time is after the validity deadline of the third request control information, the traffic required for the request of an identical type or of an identical object name received by the executive body may be counted.

Step 304, generating fourth request control information based on a preset traffic threshold and the determined traffic.

After counting the traffic, by combining the preset traffic threshold, the executive body may generate the fourth request control information. When it is determined that the counted traffic is greater than or equal to the traffic threshold, the executive body may generate the fourth request control information for rejecting the request. When it is determined that the counted traffic is less than the traffic threshold, the executive body may generate the fourth request control information for accepting the request.

Step 305, sending the fourth request control information to the access server.

After generating the fourth request control information, the executive body may send the fourth request control information to the access server. It may be understood that, in order to improve the forwarding efficiency of the fourth request control information, the executive body may send the fourth request control information to a plurality of access servers connected thereto.

The method for processing a request provided by the above embodiment of the present disclosure, after receiving the request, may determine the type of the request or the object name indicated by the request, after determining that the current time is after the validity deadline of the locally stored third request control information, count the traffic required for the request of an identical type or of an identical object name, then generate the fourth request control information based on the traffic and the preset traffic threshold, and finally, send the fourth request control information to the access server. The method of the present embodiment may be applied to a distributed system, where a single control server is responsible for requests of an identical type or of an identical object name, and thus may control the request based on global data; and at the same time, by setting a validity deadline for the third request control information, the request may be flexibly controlled, thereby improving the accuracy of controlling the request in the distributed environment.

In some alternative implementations of the present embodiment, the above method may further include the following step not shown in FIG. 3: in response to determining that the current time is before the validity deadline of the locally stored third request control information, sending the third request control information and the validity deadline of the third request control information to the access server, for the access server to store the third request control information and the validity deadline locally.

In this implementation, when the executive body determines that the current time is before the validity deadline of the locally stored third request control information, it is determined that the third request control information is still valid. Then, the third request control information and the validity deadline of the third request control information may be sent to the access server. After receiving the third request control information and the validity deadline, the access server may store the information in the access server locally. In this way, the access server may process the request according to the third request control information before the validity deadline of the third request control information.

In some alternative implementations of the present embodiment, the above method may further include the following steps not shown in FIG. 3: storing the fourth request control information locally as new third request control information, to replace the original third request control information; and determining, based on a generation time of the fourth request control information and a preset first validity duration, a first validity deadline of the fourth request control information.

After generating the fourth request control information, the executive body may store the fourth request control information locally as the new third request control information, to replace the original third request control information. At the same time, the executive body may further determine the first validity deadline of the fourth request control information based on the generation time of the fourth request control information and the preset first validity duration. For example, the generation time of the fourth request control information is 16:00:00, the first validity duration is 60 seconds, and the first validity deadline is 16:01:00.

In some alternative implementations of the present embodiment, the step 305 may be implemented by the following steps not shown in FIG. 3: setting the number of forwarding times of the fourth request control information to a first preset value; determining, based on the generation time of the fourth request control information and a preset second validity duration, a second validity deadline of the fourth request control information; and sending the fourth request control information, the number of forwarding times, and the second validity deadline to the access server, so that the access server increases the number of forwarding times by a second preset value when forwarding the fourth request control information.

In this implementation, the executive body may set the number of forwarding times of the fourth request control information to the first preset value. The first preset value may be 1 or 0. Then, based on the generation time of the fourth request control information and the preset second validity duration, the second validity deadline of the fourth request control information is determined. Finally, the executive body may send the fourth request control information, the number of forwarding times, and the second validity deadline to the access server. After receiving the fourth request control information, the number of forwarding times, and the second validity deadline, the access server may store them in the access server locally. At the same time, when the access server forwards the fourth request control information, the number of forwarding times may be increased by the second preset value. The second preset value may be 1.

In some alternative implementations of the present embodiment, the second validity duration is greater than the first validity duration. For example, the first validity duration may be 10 seconds and the second validity duration may be 60 seconds. Thus, if the control server fails, the access server may still process the request based on the locally stored request control information, providing time to recover the control server. It also provides time to select a new control server from the control server set to be responsible for this type of request.

Figure 4:
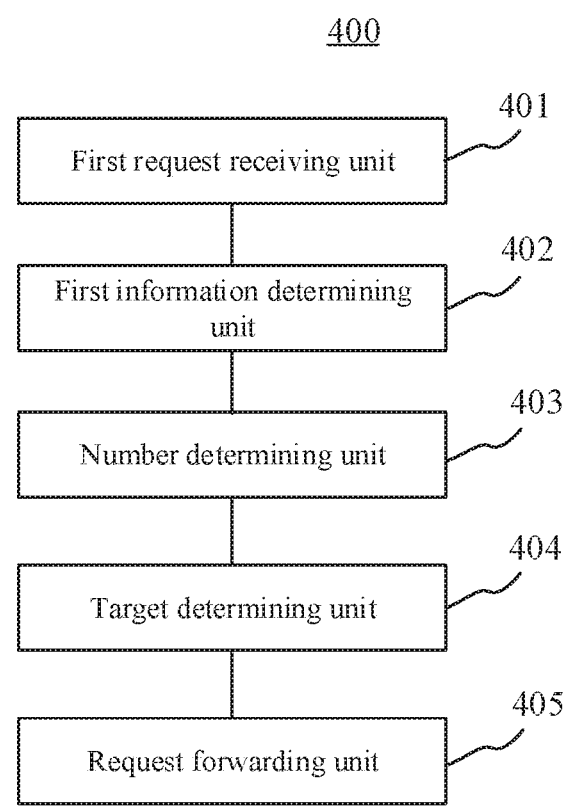
FIG. 4 is a schematic structural diagram of an embodiment of an apparatus for processing a request according to the present disclosure.

With further reference to FIG. 4, as an implementation of the method shown in the above figures, the present disclosure provides an embodiment of an apparatus for processing a request, and the apparatus embodiment corresponds to the method embodiment as shown in FIG. 2, and the apparatus may be specifically applied to various electronic devices.

As shown in FIG. 4, an apparatus 400 for processing a request of the present embodiment includes: a first request receiving unit 401, a first information determining unit 402, a number determining unit 403, a target determining unit 404 and a request forwarding unit 405.

The first request receiving unit 401 is configured to receive a request.

The first information determining unit 402 is configured to determine a type of the request or an object name indicated by the request.

The number determining unit 403 is configured to acquire, in response to determining that a current time is after a validity deadline of locally stored first request control information, the number of control servers in a preset control server set.

The target determining unit 404 is configured to determine, from the control server set, a target control server based on the acquired number and any one of the following: the type of the request, the object name indicated by the request.

The request forwarding unit 405 is configured to forward the request to the target control server.

In some alternative implementations of the present embodiment, the apparatus 400 may further include a first request processing unit not shown in FIG. 4, configured to process the request based on the first request control information, in response to determining that the current time is before the validity deadline of the first request control information.

In some alternative implementations of the present embodiment, the target determining unit 404 may be further configured to: determine a hash value by performing a hash calculation on any of the following: the type of the request, the object name indicated by the request; and determine the target control server from the control server set based on the hash value and the number.

In some alternative implementations of the present embodiment, the apparatus 400 may further include a first information receiving unit and a second request processing unit not shown in FIG. 4.

The first information receiving unit is configured to receive second request control information and a validity deadline of the second request control information. The second request control information is received from the target control server or other access server.

The second request processing unit is configured to process the received request based on the second request control information, in response to the current time being before the validity deadline of the second request control information.

In some alternative implementations of the present embodiment, the apparatus 400 may further include a first information storing unit not shown in FIG. 4, configured to store the second request control information and the validity deadline of the second request control information locally to replace the original first request control information and replace the validity deadline of the original first request control information.

In some alternative implementations of the present embodiment, the second request control information includes the number of forwarding times. The apparatus 400 may further include a first information forwarding unit not shown in FIG. 4, configured to send the second request control information and the validity deadline of the second request control information to at least one access server connected, in response to determining that the current time is before the validity deadline of the second request control information and the number of forwarding times is less than a preset number of forwarding threshold; and increase the number of forwarding times by a preset value.

The apparatus for processing a request provided by the above embodiment of the present disclosure may be applied to a distributed system and send the request to the corresponding control server, which is convenient for the control server to control the request based on global data, thereby improving the accuracy of controlling the request in the distributed environment.

It should be understood that the units 401 to 405 described in the apparatus 400 for processing a request correspond to the steps in the method described with reference to FIG. 2, respectively. Thus, the operations and features described above for the method for processing a request are equally applicable to the apparatus 400 and the units contained therein, and detailed description thereof will be omitted.

Figure 5:
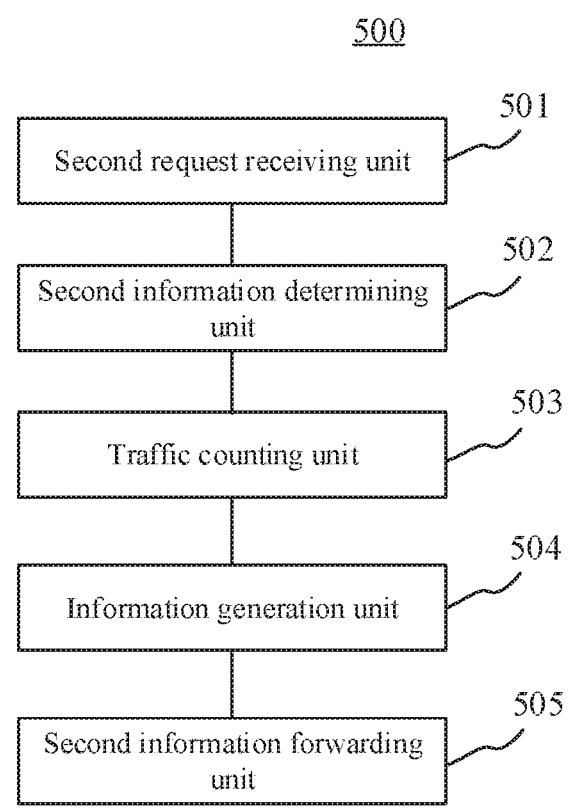
FIG. 5 is a schematic structural diagram of another embodiment of an apparatus for processing a request according to the present disclosure.

With further reference to FIG. 5, a schematic structural diagram of another embodiment of an apparatus for processing a request according to the present disclosure is illustrated. As shown in FIG. 5, the apparatus 500 for processing a request in the present embodiment may include a second request receiving unit 501, a second information determining unit 502, a traffic counting unit 503, an information generation unit 504, and a second information forwarding unit 505.

The second request receiving unit 501 is configured to receive a request sent by an access server.

The second information determining unit 502 is configured to determine a type of the request or an object name indicated by the request.

The traffic counting unit 503 is configured to count a traffic required for the requests of an identical type or of an identical object name, in response to determining that a current time is after a validity deadline of locally stored third request control information.

The information generation unit 504 is configured to generate fourth request control information based on a preset traffic threshold and the determined traffic.

The second information forwarding unit 505 is configured to send the fourth request control information to the access server.

In some alternative implementations of the present embodiment, the apparatus 500 may further include a third information forwarding unit not shown in FIG. 5, configured to send the third request control information and the validity deadline of the third request control information to the access server, in response to determining that the current time is before the validity deadline of the locally stored third request control information, for the access server to store the third request control information and the validity deadline locally.

In some alternative implementations of the present embodiment, the apparatus 500 may further include a second information storing unit and a time determining unit not shown in FIG. 5.

The second information storing unit is configured to store the fourth request control information locally as new third request control information to replace the original third request control information.

The time determining unit is configured to determine, based on a generation time of the fourth request control information and a preset first validity duration, a first validity deadline of the fourth request control information.

In some alternative implementations of the present embodiment, the second information forwarding unit 505 may further include a number determining module, a time determining module and an information forwarding module not shown in FIG. 5.

The number determining module is configured to set the number of forwarding times of the fourth request control information to a first preset value.

The time determining module is configured to determine, based on the generation time of the fourth request control information and a preset second validity duration, a second validity deadline of the fourth request control information.

The information forwarding module is configured to send the fourth request control information, the number of forwarding times, and the second validity deadline to the access server, so that the access server increases the number of forwarding times by a second preset value when forwarding the fourth request control information.

In some alternative implementations of the present embodiment, the second validity duration is greater than the first validity duration.

The apparatus for processing a request provided by the above embodiment of the present disclosure may be applied to a distributed system, where a single control server is responsible for requests of an identical type or of an identical object name, and thus may control the requests based on global data; and at the same time, by setting a validity deadline for the third request control information, the requests may be flexibly controlled, thereby improving the accuracy of controlling the request in the distributed environment.

It should be understood that the units 501 to 505 described in the apparatus 500 for processing a request correspond to the steps in the method described with reference to FIG. 3, respectively. Thus, the operations and features described above for the method for processing a request are equally applicable to the apparatus 500 and the units contained therein, and detailed description thereof will be omitted.

Figure 6:
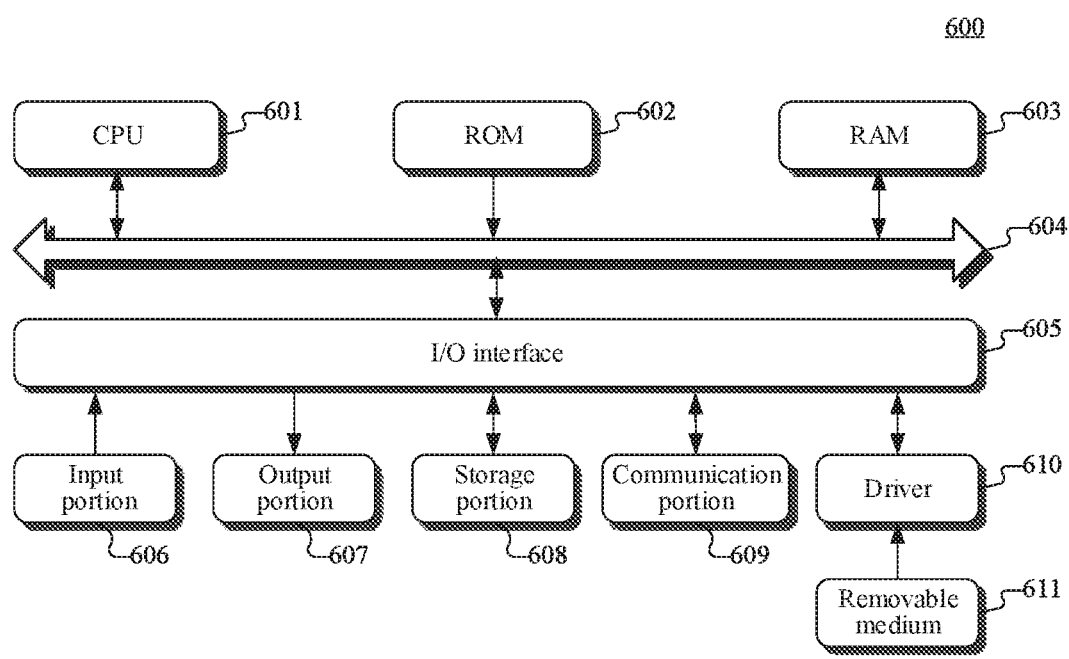
FIG. 6 is a schematic structural diagram of a computer system adapted to implement an access server or control server of the embodiments of the present disclosure.

With further reference to FIG. 6, a schematic structural diagram of a computer system 600 adapted to implement an access server or control server of the embodiments of the present disclosure is shown. The access server or control server shown in FIG. 6 is merely an example, and should not impose any limitation on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including such as a keyboard, a mouse; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above.

In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including a first request receiving unit, a first information determining unit, a number determining unit, a target determining unit and a request forwarding unit, or, a processer including a second request receiving unit, a second information determining unit, a traffic counting unit, an information generation unit, and a second information forwarding unit. Here, the names of these units do not in some cases constitute limitations to such units themselves. For example, the first request receiving unit may also be described as "a unit configured to receive a request".

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: receive a request; determine a type of the request or an object name indicated by the request; in response to determining that a current time is after a validity deadline of locally stored first request control information, acquire the number of control servers in a preset control server set; determine, from the control server set, a target control server based on the acquired number and any one of: the type of the request, the object name indicated by the request; and forward the request to the target control server. Or, the one or more programs, when executed by the apparatus, cause the apparatus to: receive a request sent by an access server; determine a type of the request or an object name indicated by the request; count a traffic required for the requests of an identical type or of an identical object name, in response to determining that a current time is after a validity deadline of locally stored third request control information; generate fourth request control information based on a preset traffic threshold and the determined traffic; and send the fourth request control information to the access server.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for processing a request, applied to an access server, comprising:
   receiving a request;
   determining a type of the request or an object name indicated by the request;
   in response to determining that a current time is after a validity deadline of locally stored first request control information, acquiring a number of control servers in a preset control server set;
   determining, from the control server set, a target control server based on the acquired number and any one of: the type of the request, the object name indicated by the request;
   forwarding the request to the target control server;
   receiving, from the target control server or other access server, second request control information and a validity deadline of the second request control information, wherein the second request control information comprises a number of forwarding times;
   in response to determining that the current time is before the validity deadline of the second request control information and the number of forwarding times is less than a preset number of forwarding threshold, sending the second request control information and the validity deadline of the second request control information to at least one access server connected thereto; and
   increasing the number of forwarding times by a preset value.

2. The method according to claim 1, wherein the method further comprises:
   in response to determining that the current time is before the validity deadline of the first request control information, processing the request based on the first request control information.

3. The method according to claim 1, wherein the determining, from the control server set, a target control server based on the acquired number and any one of: the type of the request, the object name indicated by the request, comprises:
   determining a hash value by performing a hash calculation on any of: the type of the request, the object name indicated by the request; and
   determining the target control server from the control server set based on the hash value and the number.

4. The method according to claim 1, wherein the method further comprises:
   in response to the current time being before the validity deadline of the second request control information, processing the received request based on the second request control information.

5. The method according to claim 1, wherein the method further comprises:
   storing the second request control information and the validity deadline of the second request control information locally, to replace the original first request control information and replace the validity deadline of the original first request control information.

6. A method for processing a request, applied to a control server, comprising:
   receiving a request sent by an access server;

determining a type of the request or an object name indicated by the request;

in response to determining that a current time is after a validity deadline of locally stored third request control information, counting a traffic required for requests of an identical type or of an identical object name;

generating fourth request control information based on a preset traffic threshold and the determined traffic; and sending the fourth request control information to the access server, wherein the sending comprises:

setting a number of forwarding times of the fourth request control information to be a first preset value;

determining, based on the generation time of the fourth request control information and a preset second validity duration, a second validity deadline of the fourth request control information; and sending the fourth request control information, the number of forwarding times, and the second validity deadline to the access server, so that the access server increases the number of forwarding times by a second preset value when forwarding the fourth request control information.

7. The method according to claim 6, wherein the method further comprises:

in response to determining that the current time is before the validity deadline of the locally stored third request control information, sending the third request control information and the validity deadline of the third request control information to the access server, for the access server to store the third request control information and the validity deadline locally.

8. The method according to claim 6, wherein the method further comprises:

storing the fourth request control information locally as new third request control information, to replace the original third request control information; and determining, based on a generation time of the fourth request control information and a preset first validity duration, a first validity deadline of the fourth request control information.

9. The method according to claim 8, wherein the second validity duration is greater than the first validity duration.

10. An apparatus for processing a request, disposed on an access server, comprising:

at least one processor; and a memory storing instructions, the instructions when executed by the at least one processor, cause the at least one processor to perform operations, the operations comprising:

receiving a request;

determining a type of the request or an object name indicated by the request;

in response to determining that a current time is after a validity deadline of locally stored first request control information, acquiring a number of control servers in a preset control server set;

determining, from the control server set, a target control server based on the acquired number and any one of: the type of the request, the object name indicated by the request;

forwarding the request to the target control server;

receiving, from the target control server or other access server, second request control information and a validity deadline of the second request control information, wherein the second request control information comprises a number of forwarding times;

in response to determining that the current time is before the validity deadline of the second request control information and the number of forwarding times is less than a preset number of forwarding threshold, sending the second request control information and the validity deadline of the second request control information to at least one access server connected thereto; and increasing the number of forwarding times by a preset value.

11. The apparatus according to claim 10, wherein the operations further comprise:

processing the request based on the first request control information, in response to determining that the current time is before the validity deadline of the first request control information.

12. The apparatus according to claim 10, wherein the determining, from the control server set, a target control server based on the acquired number and any one of:

the type of the request, the object name indicated by the request, comprises:

determining a hash value by performing a hash calculation on any of: the type of the request, the object name indicated by the request; and determining the target control server from the control server set based on the hash value and the number.

13. The apparatus according to claim 10, wherein the operations further comprise:

processing the received request based on the second request control information, in response to the current time being before the validity deadline of the second request control information.

14. The apparatus according to claim 10, wherein the operations further comprise:

storing the second request control information and the validity deadline of the second request control information locally, to replace the original first request control information and replace the validity deadline of the original first request control information.

15. An apparatus for processing a request, disposed in a control server, comprising:

at least one processor; and a memory storing instructions, the instructions when executed by the at least one processor, cause the at least one processor to perform the method of claim 6.

16. A non-transitory computer readable medium, storing a computer program thereon, the program, when executed by a processor, implements the method according to claim 1.

17. A non-transitory computer readable medium, storing a computer program thereon, the program, when executed by a processor, implements the method according to claim 6.

* * * * *